United States Patent
Hoffmann et al.

(10) Patent No.: US 12,247,517 B2
(45) Date of Patent: Mar. 11, 2025

(54) SYSTEMS AND METHODS FOR MODEL-BASED CONTROL OF GAS TURBINE SYSTEM CONSIDERING FLUID INJECTION

(71) Applicant: General Electric Company, Schenectady, NY (US)

(72) Inventors: Juergen Gerhard Hoffmann, Untersiggenthal (CH); Harold Lamar Jordan, Greenville, SC (US); Thomas John Freeman, Canton, GA (US)

(73) Assignee: GE Infrastructure Technology LLC, Greenville, SC (US)

( * ) Notice: Subject to any disclaimer, the term of this patent is extended or adjusted under 35 U.S.C. 154(b) by 199 days.

(21) Appl. No.: 17/991,781

(22) Filed: Nov. 21, 2022

(65) Prior Publication Data
US 2024/0167425 A1   May 23, 2024

(51) Int. Cl.
*F02C 9/18* (2006.01)
*F02C 3/30* (2006.01)
*F02C 9/16* (2006.01)

(52) U.S. Cl.
CPC ............... *F02C 3/305* (2013.01); *F02C 9/16* (2013.01); *F02C 9/18* (2013.01); *F05D 2270/303* (2013.01); *F05D 2270/3061* (2013.01); *F05D 2270/44* (2013.01); *F05D 2270/71* (2013.01)

(58) Field of Classification Search
CPC ............... F02C 9/18; F02C 7/18; F02C 3/305
See application file for complete search history.

(56) References Cited

U.S. PATENT DOCUMENTS

| | | |
|---|---|---|
| 6,478,534 B2 | 11/2002 | Bangert et al. |
| 7,742,904 B2 | 6/2010 | Healy et al. |
| 7,835,392 B2 | 11/2010 | Wang |
| 7,853,392 B2 | 12/2010 | Healey et al. |
| 8,423,161 B2 | 4/2013 | Wilkes et al. |
| 8,820,091 B2 | 9/2014 | Tham et al. |
| 8,893,510 B2 | 11/2014 | Tham et al. |
| 8,973,372 B2 | 3/2015 | Lee et al. |
| 9,043,118 B2 | 5/2015 | Healey |
| 10,982,599 B2 | 4/2021 | Kraft et al. |

(Continued)

FOREIGN PATENT DOCUMENTS

EP   3070300 A1   9/2016

OTHER PUBLICATIONS

PCT International Search Report and Written Opinion of Application No. PCT/US2023/080022; dated Mar. 18, 2024; 12 pages.

*Primary Examiner* — Katheryn A Malatek
(74) *Attorney, Agent, or Firm* — Fletcher Yoder, P.C.

(57) ABSTRACT

A system includes a gas turbine system having a compressor, a combustor, and a turbine. The system further includes a power management system configured to supply an injection fluid into a host fluid of the gas turbine system to manage power production of the gas turbine system, wherein the injection fluid comprises a gas mixture comprising oxygen. The system further includes a model-based controller configured to control operation of the gas turbine system, wherein the model-based controller has one or more models including consideration of the injection fluid supplied by the power management system into the host fluid.

22 Claims, 4 Drawing Sheets

(56) References Cited

U.S. PATENT DOCUMENTS

| | | | |
|---|---|---|---|
| 2005/0022499 A1* | 2/2005 | Belokon | F23C 9/00 |
| | | | 60/39.511 |
| 2007/0034704 A1 | 2/2007 | Hue et al. | |
| 2014/0123624 A1 | 5/2014 | Minto | |
| 2014/0230400 A1 | 8/2014 | Light et al. | |
| 2014/0301820 A1 | 10/2014 | Lohse et al. | |
| 2014/0373551 A1 | 12/2014 | Kraft et al. | |
| 2016/0326965 A1 | 11/2016 | Pereti et al. | |
| 2017/0030228 A1* | 2/2017 | Jordan, Jr. | F02C 7/18 |
| 2019/0234303 A1 | 9/2019 | Kraft et al. | |

* cited by examiner

SYSTEMS AND METHODS FOR MODEL-BASED CONTROL OF GAS TURBINE SYSTEM CONSIDERING FLUID INJECTION

BACKGROUND

The subject matter disclosed herein relates to controls for gas turbine systems, and more specifically to, controls for gas turbine systems having fluid injection for power management.

Industrial machines, such as gas turbine systems, may provide for the generation of power. For example, the gas turbine system may include a compressor for compressing a working fluid (e.g., air), a combustor for combusting a fuel with the compressed working fluid to produce hot combustion gases, and a turbine driven by the hot combustion gases to drive a load. The load may include an electric generator configured to generate electrical power for a power distribution grid. Thus, the gas turbine system may be part of a power plant. The power production of the gas turbine system impacts the efficiency of the power plant. Accordingly, it would be beneficial to manage power of the gas turbine system using fluid injection. However, an admixture of fluids has a noticeable influence on the combustion dynamics. In particular, an admixture of gases comprising oxygen into the main working fluid of a gas turbine can change the combustion dynamics. An oxygen comprising gas can be for example air, the flue gas of a gas turbine, or a mixture of air and a flue gas. The resulting change in the temperature and composition of the gas mixture reacting with the fuel in the combustion chamber can cause for example pulsations. A need exists for control of the gas turbine system to account for any injection of oxygen comprising gas, thereby helping to control operating parameters of the gas turbine system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In certain embodiments, a system includes a gas turbine system having a compressor, a combustor, and a turbine. The system further includes a power management system configured to supply an injection fluid into a host fluid of the gas turbine system to manage power production of the gas turbine system, wherein the injection fluid comprises a gas mixture comprising oxygen. The system further includes a model-based controller configured to control operation of the gas turbine system, wherein the model-based controller has one or more models including consideration of the injection fluid supplied by the power management system into the host fluid.

In certain embodiments, a system includes a model-based controller configured to control operation of a gas turbine system coupled to a power management system. The gas turbine system has a compressor, a combustor, and a turbine. The power management system is configured to supply an injection fluid into a host fluid of the gas turbine system to manage power production of the gas turbine system, wherein the injection fluid comprises a gas mixture comprising oxygen. The model-based controller has a processor, a memory, and one or more models including consideration of the injection fluid supplied by the power management system into the host fluid.

In certain embodiments, a method includes controlling operation of a gas turbine system coupled to a power management system via a model-based controller. The gas turbine system has a compressor, a combustor, and a turbine. The power management system is configured to supply an injection fluid into a host fluid of the gas turbine system to manage power production of the gas turbine system, wherein the injection fluid comprises a gas mixture comprising oxygen. The model-based controller has one or more models including consideration of the injection fluid supplied by the power management system into the host fluid.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
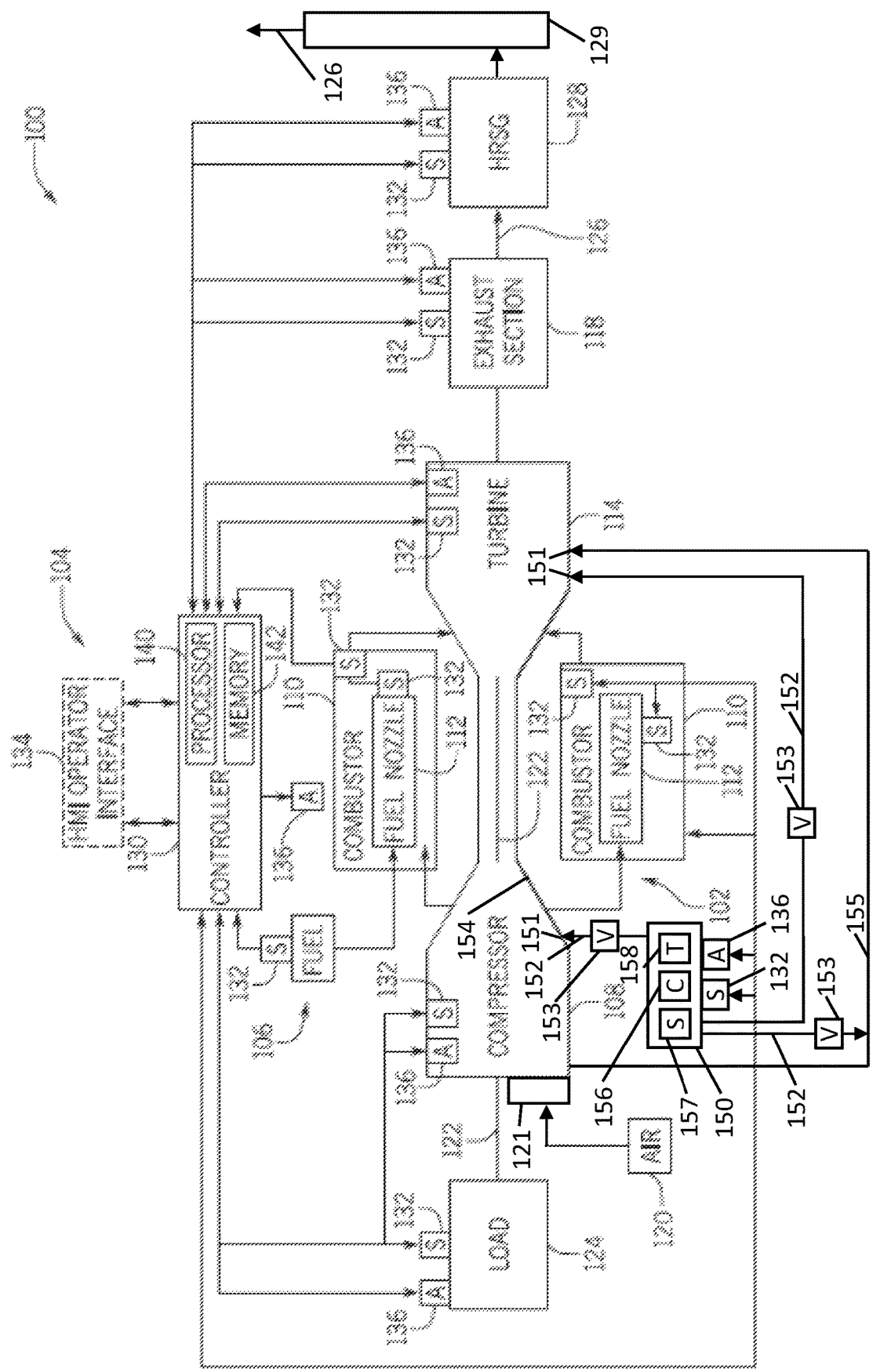
FIG. 1 is a block diagram of an embodiment of a gas turbine system coupled to a fluid injection power management system configured to supply an injection fluid into a host fluid of the gas turbine system, wherein a model-based controller includes consideration of injection fluid properties.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers; specific goals, such as compliance with system-related and business-related constrains, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, the term "or" is intended to be inclusive indicating that A or B includes A alone, B alone, or both A and B.

The present disclosure is generally directed to gas turbine systems that includes a fluid injection power management system. In operation, the fluid injection power management system may inject a fluid (e.g., a gas mixture comprising oxygen such as air, nitrogen, steam, water, or any combination thereof) via a compressor section to manage or control mass fluid flow in the gas turbine system. The added fluid may thus result in added rotative power of the gas turbine system. In some embodiments, the fluid injection power management system may use an electric compressor to inject the fluid into the gas turbine system, thus reducing the carbon footprint. In certain embodiments, the fluid injection power management system may be retrofitted in situ to an existing gas turbine system. That is, the fluid injection power management system may be provided as a retrofit kit to be installed and used to manage or control power of an existing gas turbine system.

The techniques described herein further include model-based controller embodiments suitable for controlling the gas turbine system when the fluid injection power management system is in place. The model-based controller may include, for example, a computer simulation or model of the gas turbine system, the fluid injection power management system, and various subcomponents. The computer model may be an arrangement of one or more mathematical representations of the operating parameters. Each of these representations may rely on input values to generate an estimated value of a modeled operating parameter. The mathematical representations may generate a surrogate operating parameter value that may be used in circumstances where a measured parameter value is not available. The modeled operating parameters may include, but are not limited to, compressor airflow, combustor fuel/air ratio, firing temperature, combustor flame temperature, fuel system pressure ratios, acoustic characteristics and combustion dynamics, hot gas flow through the turbine (e.g., combustion and/or exhaust gas flow), or any combination thereof. The computer model may be a physics-based aero-thermodynamic computer model, a regression-fit model, neural-net model, or any other suitable computer model, or a combination thereof, of the gas turbine system, the fluid injection power management system, and various subcomponents. The computer model may receive certain inputs to facilitate the simulation and control. However, when unexpected changes are made that are not considered by the computer model, the model-based controller may not be capable of efficiently and/or accurately controlling the various operating parameters.

In the presently disclosed embodiments, the model-based controllers are enhanced to incorporate information about any fluid injection, such as injection of compressed air from one or more external compressors, for power management of the gas turbine system. The fluid injection (e.g., injection of compressed air) is separate or in addition to the compressed air from a main compressor of the gas turbine system. For example, one or more external compressors may provide the fluid injection at one or more fluid injection points, such as one or more fluid injection points between a compressor discharge from the main compressor and a combustor, one or more fluid injection points along a compressor bleed line from the main compressor to a turbine, or any combination thereof. The fluid injection may include a variety of properties, such as a fluid composition, a temperature, a pressure, a flow rate, an injection location, or any combination thereof. Without the disclosed embodiments, the model-based controller may be unaware of specific details about any fluid injection (e.g., injection of compressed air) for power management, and thus may blindly attempt to control the gas turbine system based on observed changes in operation of the gas turbine system. However, in the disclosed embodiments, the model-based controller is configured to receive and process information about the fluid injection (e.g., properties of the fluid injection) into the model-based controller, thereby adjusting operation of the gas turbine system to account for the fluid injection. The information about the fluid injection may help to enable accurate control of various parameters of the gas turbine system, such as the firing objectives (e.g., firing temperature, combustion gas temperature inside the combustor, turbine inlet temperature, etc.), combustion characteristics, combustion dynamics, exhaust gas emissions (e.g., nitrogen oxides ($NO_X$), carbon oxides ($CO_X$), sulfur oxides ($SO_X$), unburnt hydrocarbons, etc.), parts life and reliability, power output, efficiency, fuel flow to the fuel nozzles in the combustor, fuel split between fuel nozzles, compressor bleed flow, inlet guide vane position, or any combination thereof. As discussed below, the model-based controller may process the fluid injection information in combination with other flows (e.g., fluid injection flow combined with main compressor flow into the combustor, fluid injection flow combined with compressor bleed flow into the turbine, etc.), or separate from other flows (e.g., fluid injection flow considered separate from main compressor flow into the combustor, fluid injection flow considered separate from compressor bleed flow into the turbine, etc.), or any combination thereof.

The model-based controllers enhanced with information about the fluid injection may include one or more types of computer simulations or models, such as one or more physics-based models, one or more regression-based models, or a combination thereof, of the gas turbine system. In some embodiments, the controller may use a physics-based model controller, which includes one or more physics-based models of properties (e.g., thermodynamic properties) of the gas turbine system, wherein the physics-based model controller is improved by inputting information about the fluid injection into the physics-based model. An example of the physics-based model is an Adaptive Real-time Engine Simulator (ARES) model by Generical Electric Company of Schenectady, NY. In certain embodiments, the controller may use a regression-based model controller, which includes one or more regression-based models of properties of the gas turbine system, wherein the regression-based model controller is improved by inputting information about the fluid injection into the regression-based model. An example of the regression-based model includes turbine inlet temperature (TIT) functions, which may be modified to incorporate certain fluid injection variables and used to improve control of the gas turbine system. The TIT may correspond to the combustion gas temperature at or upstream from the first stage nozzle of the turbine. However, the temperature function also may be used for the combustion gas temperature just downstream from the first stage nozzle of the turbine, such as a firing temperature function. By incorporating the fluid injection information as inputs into the model-based controllers, the techniques described herein may enable power management or control of gas turbine systems in a more efficient and improved manner. The disclosed embodiments of model based controllers enable much more precise control of fast transient as it can model the dynamic change of flows and predict the ratio of host flow and oxygen comprising gas as well as their change of temperatures and pressures over time in response to operational parameters, e.g., a change in a control valve stroke. For fast transients, the properties predicted by the model can be used to improve the control.

FIG. 1 illustrates an embodiment of a power production system 100 having a gas turbine system 102 with a controller 130 and a fluid injection power management system 150, wherein the controller 130 comprises a model-based controller having one more computer models (e.g., physics-based models and/or regression-based models) that receive information about the fluid injection by the fluid injection power management system 150 for enhanced control of the power production system 100. In particular, the controller 130 (e.g., model-based controller) may receive monitored information about the fluid injection, such as injection locations, fluid properties (e.g., temperature, pressure, flow rate, fluid composition, etc.), or any combination thereof. The computer models (e.g., physics-based models and/or regression-based models) use the fluid information independently and/or in combination with other fluid information, such as the main compressed air flow from the compressor 108, the compressor bleed flow from the compressor 108 to the turbine 114, and/or the hot gas flow through the turbine 114 (e.g., combustion gas flow and/or exhaust gas flow), at the fluid injection points of the fluid injection power management system 150. Various details of the enhanced model-based control by the controller 130 is discussed in further detail below.

As illustrated in FIG. 1, the power production system 100 may include a gas turbine system 102, a monitoring and control system 104, and a fuel supply system 106. The gas turbine system 102 may include a compressor section or compressor 108, a combustor section or combustor 110, one or more fuel nozzles 112, a gas turbine section or turbine 114, and an exhaust section 118. The compressor 108 may include one or more compressors or compressor stages, such as 1 to 30 compressor stages. In the illustrated embodiment, the compressor 108 is a main compressor for the gas turbine system 102. The combustor 110 may include one or more combustors, such as an annular combustor or a plurality of combustor cans disposed circumferentially about a central axis. The turbine 114 may include one or more turbines or turbine stages, such as 1 to 10 turbine stages.

During operation, the gas turbine system 102 may direct an oxidant (e.g., air 120) into the compressor 108, which may then compress the air 120 and move the air 120 to the combustor 110. The compressor 108 also may include inlet guide vanes (IGV) 121, which are adjustable to regulate the oxidant intake into the compressor 108. In the combustor 110, the fuel nozzle 112 (or a plurality of fuel nozzles 112) may inject fuel that mixes with the compressed air 120 to create, for example, an air-fuel mixture. The air-fuel mixture may then combust in the combustor 110 to generate hot combustion gases, which flow downstream into and through the turbine 114 to drive one or more turbine stages. In operation, the combustion gases may flow through the turbine 114 to drive one or more stages of turbine blades, which may in turn drive rotation of a shaft 122. The shaft 122 may connect to a load 124, such as an electric generator that uses the torque of the shaft 122 to produce electricity. After passing through the turbine 114, the hot combustion gases may vent as exhaust gases 126 into the environment by way of the exhaust section 118. In the present discussion, the terms combustion gas flow and exhaust gas flow may be used interchangeably to refer to the hot products of combustion generated in the combustor 110, which then flow downstream through the turbine 114 and various downstream equipment. The exhaust gas 126 may include undesirable exhaust gas emissions, which may include carbon oxides ($CO_X$) such as carbon dioxide ($CO_2$) and carbon monoxide (CO), nitrogen oxides ($NO_X$) such as nitrogen dioxide ($NO_2$), sulfur oxides ($SO_X$) such as sulfur dioxide ($SO_2$), unburnt hydrocarbons, and so forth. The enhanced control by the controller 130, which receives information about the fluid injection into the computer models, is configured to help control the exhaust gas emissions.

The exhaust gas 126 may include thermal energy, and the thermal energy may be recovered, in some embodiments, by a heat recovery steam generation (HRSG) system 128 before discharge to the environment through an exhaust stack 129. The HRSG system 128 includes a plurality of heat exchangers configured to transfer heat from the exhaust gas 126 to generate steam. In some embodiments, the HRSG system 128 may not be present. In embodiments with the HRSG system 128, the hot exhaust gas 126 from the gas turbine 114 flows through the HRSG system 128 to recover heat from the exhaust gas 126 to generate steam. For example, the heat from the exhaust 126 may be used to generate low-pressure steam, intermediate-pressure steam, and/or high-pressure steam. The steam produced by the HRSG system 128 may then flow through a steam turbine engine for further power generation. In addition, the produced steam may be supplied to any other systems in the power production system 100, such as a gasifier used to gasify a feedstock to produce untreated syngas, a gas treatment system used to remove undesirable gases from the exhaust 126, or any combination thereof. In a "combined cycle" system, the gas turbine engine generation cycle is often referred to as the "topping cycle," whereas the steam turbine engine generation cycle is often referred to as the "bottoming cycle." In particular, exhaust heat from the topping cycle may be captured and used to generate steam for use in the bottoming cycle, thereby improving efficiencies in both cycles.

As discussed above, the power production system 100 includes controller 130, such as an electronic controller (e.g., a processor-based controller), configured to control operation of the gas turbine system 102, the fluid injection power management system 150, and other components. The controller 130 may be communicatively coupled to a plurality of sensors 132, a human machine interface (HMI) operator interface 134, and one or more actuators 136 suitable for controlling components of the power production system 100. The actuators 136 may include valves, switches, positioners, pumps, and the like, suitable for controlling the various components of the power production system 100. The controller 130 may receive sensor feedback from the sensors 132 and use the sensor feedback to control various components of the gas turbine system 102, including the compressor 108, the combustors 110, the turbine 114, the exhaust section 118, the load 124, the HRSG 128, the fluid injection power management system 150, and so forth. The sensors 132 may include temperature sensors, pressure sensors, flow rate sensors, fluid composition sensors, exhaust gas emissions sensors, vibration sensors, combustion dynamics sensors, or any combination thereof. The sensor feedback may include characteristics or properties of fluid injection by the fluid injection power management system 150, such as the temperature, the pressure, the flow rate, the fluid composition (e.g., gas composition, moisture content, etc.), the injection location, or any combination thereof, of the fluid injection. As discussed in further detail below, the controller 130 (e.g., model-based controller) is configured to input the sensor feedback of the fluid injection into computer models (e.g., physics-based models and/or regression-based models), which are configured to adjust operating parameters of the gas turbine system 102 and the fluid injection power management system 150 to achieve various control objectives (e.g., firing objectives, exhaust gas emissions, parts life and reliability, combustion dynamics, etc.).

In certain embodiments, the HMI operator interface 134 may be executable by one or more computer systems of the power production system 100. A plant operator may interface with the power production system 100 via the HMI operator interface 134. Accordingly, the HMI operator interface 134 may include various input and output devices (e.g., mouse, keyboard, monitor, touch screen, or other suitable input and/or output device) such that the plant operator may provide commands (e.g., control and/or operational commands) to the controller 130.

The controller 130 may include one or more processors 140 that may execute software programs to perform the disclosed techniques, including operation of the computer models (e.g., physics-based models and/or regression-based models) to input sensor feedback regarding the fluid injection. For example, the one or more processors 140 may include one or more microprocessors, one or more "general-purpose" microprocessors, one or more special-purpose microprocessors, and/or one or more application specific integrated circuits (ASICS), or some combination thereof. By further example, the one or more processors 140 may include one or more reduced instruction set (RISC) processors. The controller 130 may include a memory device 142 that may store information such as control software, databases, look up tables, configuration data, etc. The memory device 142 may include a tangible, non-transitory, machine-readable medium, such as a volatile memory (e.g., a random-access memory (RAM)) and/or a nonvolatile memory (e.g., a read-only memory (ROM), flash memory, a hard drive, or any other suitable optical, magnetic, or solid-state storage medium, or a combination thereof).

In the depicted embodiment, the power production system 100 includes the fluid injection power management system 150 (e.g., gas injection power management system) configured to supply or inject an injection fluid (e.g., power management fluid) into the gas turbine system 102 at one or more injection locations 151 via one or more conduits or piping 152. The injection locations 151 may include one or more locations at or downstream from a compressor discharge of the compressor 108, such as a compressor discharge casing 154 between the compressor discharge and the combustor 110. The injection locations 151 may include locations at or downstream from the combustor 110, such as into the flow of combustion gases generated by the combustor 110 and routed into the turbine 114. The injection locations 151 may include locations at the turbine 114, such as a turbine inlet for the combustion gases from the combustor 110, locations at or between turbine stages of the turbine 114, and/or at compressor bleed flows from the compressor 108 into the turbine 114. Accordingly, the conduits or piping 152 may include supply conduits fluidly coupled to each of the injection locations 151, wherein one or more valves 153 may be coupled to the controller 130 to enable selective control of the injection fluids to each of the injection locations 151. In certain embodiments, the conduits or piping 152 may include a compressor bleed conduit 155 from the compressor 108 to the turbine 114. The controller 130 is configured to control the valves 153 to control the injection flows to the injection locations 151, wherein the controller 130 is also configured to receive sensor feedback from the sensors 132 regarding properties of the injection fluid as discussed above.

The injection fluid (e.g., power management fluid) injected by the fluid injection power management system 150 may include a compressed fluid, which is generally added to other fluids already flowing through the gas turbine system 102 (e.g., host fluids). For example, the injection fluid may include one or more compressed gases, such as a gas mixture comprising oxygen (e.g., air, oxygen-enriched air, or oxygen-reduced air), inert gas (e.g., nitrogen), an exhaust gas recirculation (EGR), carbon dioxide, steam, or any combination thereof. The gas mixture comprising oxygen may include any one or more gases having an oxygen content. Thus, any discussion of an injection fluid (e.g., injection gas) is intended to include one or more of the foregoing non-limiting examples. As discussed above, the sensor feedback from the sensors 132 may include the fluid composition, temperature, pressure, flow rate, injection location, and other properties of the injection fluid. The sensor feedback from the sensors 132 also may include the fluid composition, temperature, pressure, flow rate, and other properties of the host fluid (e.g., compressed air from the compressor 108 to the combustor 110, compressor bleed air from the compressor 108 to the turbine 114, combustion gas in the turbine 114, etc.) of the gas turbine system 102 at the injection location 151, such that the controller 130 can compare the host fluid with the injection fluid. During operation of the gas turbine system 102, the injection fluid may selectively flow (e.g., via control of the valves 153) through the conduits or piping 152 to the injection locations 151 and mix with the host fluids, thereby providing power management of the gas turbine system 102. For example, the injection fluid may flow into the compressor discharge casing 154, wherein the injection fluid may mix with the host compressed flow from the compressor 108 (e.g., host compressor air) prior to the combustor 110. Accordingly, a mass flow of the fluid (e.g., injection fluid added to host compressed flow) increases in the various combustors 110, increasing an amount of hot discharge gas into the turbine 114, and thus increasing power of the power production system 100. The injection fluid also may flow into one or more conduits or tubing 152 (e.g., compressor bleed conduits 155) from the compressor 108 to the turbine 114, wherein the injection fluid may mix with the host compressor bleed flow from the compressor 108 (e.g., host compressor air) prior to the turbine 114. The injection fluid also may flow into one or more conduits or tubing 152 fluidly coupled to the turbine 114, wherein the injection fluid may mix with the host hot gas flow through the turbine 114 (e.g., combustion gas flow and/or exhaust gas flow). Accordingly, the turbine 114 receives a greater a mass flow due to the addition of the injection fluid, thereby causing the turbine 114 to increase the power output by the power production system 100.

In some embodiments, the fluid injection power management system 150 may include one or more compressors 156 configured to compress a fluid (e.g., gas) from one or more gas sources 157 (e.g., air source, inert gas source, combustion and/or exhaust gas source, etc.). The one or more compressors 156 may include rotary compressors and/or reciprocating piston-cylinder compressors, which may be driven by electric motors and/or combustion engines (e.g., reciprocating piston-cylinder engines). The compressors 156 are generally separate, independent, and/or auxiliary relative to the compressor 108 of the gas turbine system 102. For example, the compressors 156 may be described as secondary and/or standalone compressors 156 relative to the gas turbine system 102. For lower carbon footprint operations, the compressors may be driven by electric motors and/or combustion engines using one or more clean fuels, such as hydrogen. Electric power for the electric motors may include the use of renewable energy sources, such as solar power systems, wind power systems (e.g., wind turbines), hydro turbine power systems, and so on. Additionally, the fluid injection power management system 150 may include fluid storage containers or tanks 158, which may be used to store compressed fluid (e.g., compressed gas mixture comprising oxygen such as air, inert gas such as nitrogen, combustion and/or exhaust gas, etc.) for injection as the injection fluid into the gas turbine system 102 at the various injection points 151. As mentioned earlier, the fluid injection power management system 150 may be provided as a retrofit kit and installed into existing power production systems 100. Accordingly, the controller 130 may include certain control updates or the control updates may be provided as already installed in a controls package when the power system 100 comes from the manufacturer with the fluid injection power management system 150 installed. The control updates may include model-based control updates, such as physics-based model updates, regression-based model updates, or any combination thereof. For example, the model-based control updates may include fluid injection updates to enable the model-based control to process sensor feedback about properties of the injection fluid supplied by the fluid injection power management system 150. For example, at each possible injection location 151, the fluid injection updates may enable the computer model to incorporate properties about the injection fluid (e.g., fluid composition, temperature, pressure, flow rate, moisture content, etc.) alone or in combination with the host fluid at the injection location 151 (e.g., compressed air in the compressor discharge casing 154, compressor bleed air, combustion and/or exhaust gas flow, etc.). As an example of a regression-based model, a formula for turbine inlet temperature (TIT) may be as set forth below in Equation (1):

$$TIT = aTAT + bp_c + c \quad (1)$$

wherein a, b, and c are constants, TAT is the turbine outlet temperature, and $p_c$ is the pressure at the compressor outlet. As an update, the regression-based model may be modified as set forth below in Equation (2):

$$TIT(\text{modified}) = TIT + C*MFR + D*TR + E*PR + F*CR \quad (2)$$

wherein TIT corresponds to the original TIT formula of Equation (1), C, D, E, and F are constants, MFR is a mass flow ratio of the injection fluid/host fluid, TR is a temperature ratio of the injection fluid/host fluid, PR is a pressure ratio of the injection fluid/host fluid, CR is a composition ratio of the injection fluid/host fluid, the injection fluid is the fluid being injected into the gas turbine system 102 by the fluid injection power management system 150, and the host fluid is the main fluid or existing fluid flow in the gas turbine system 102 at the injection location 151. In certain embodiments, the TIT (modified) formula may include additional ratios of fluid properties of the injection fluid relative to the host fluid, such as moisture content ratio (MCR), an oxygen content ratio (OCR), a nitrogen content ratio (NCR), another specific gas content ratio, or any combination thereof. Furthermore, in certain embodiments, the TIT (modified) formula may exclude one or more of the adjustments based on MFR, TR, PR, and/or CR. For example, in certain embodiments, the TIT (modified) formula may include only one, two, or three adjustments to the original TIT formula of Equation (1), such as set forth below by Equations (3) and (4).

$$TIT(\text{modified}) = TIT + C*MFR + D*TR + E*PR + F*CR \quad (3)$$

$$TIT(\text{modified}) = TIT + C*MFR + D*TR \quad (4)$$

As indicated above by Equation (3), the TIT (modified) formula may include only the original TIT formula of Equation (1) along with the adjustment based on the MFR. As indicated above by Equation (4), the TIT (modified) formula may include only the original TIT formula of Equation (1) along with the adjustment based on the MFR and the TR. In certain embodiments, the combination of C*MFR+D*TR enables an adjustment for the change of an average combustor inlet temperature due to the gas injection. This change in inlet temperature leads to a change in the TIT, which is not accounted for by the original TIT formula. Considering only the absolute injected gas flow is not precise as the compressor inlet mass flow changes with different ambient operating conditions and the inlet guide vane position.

Figure 2:
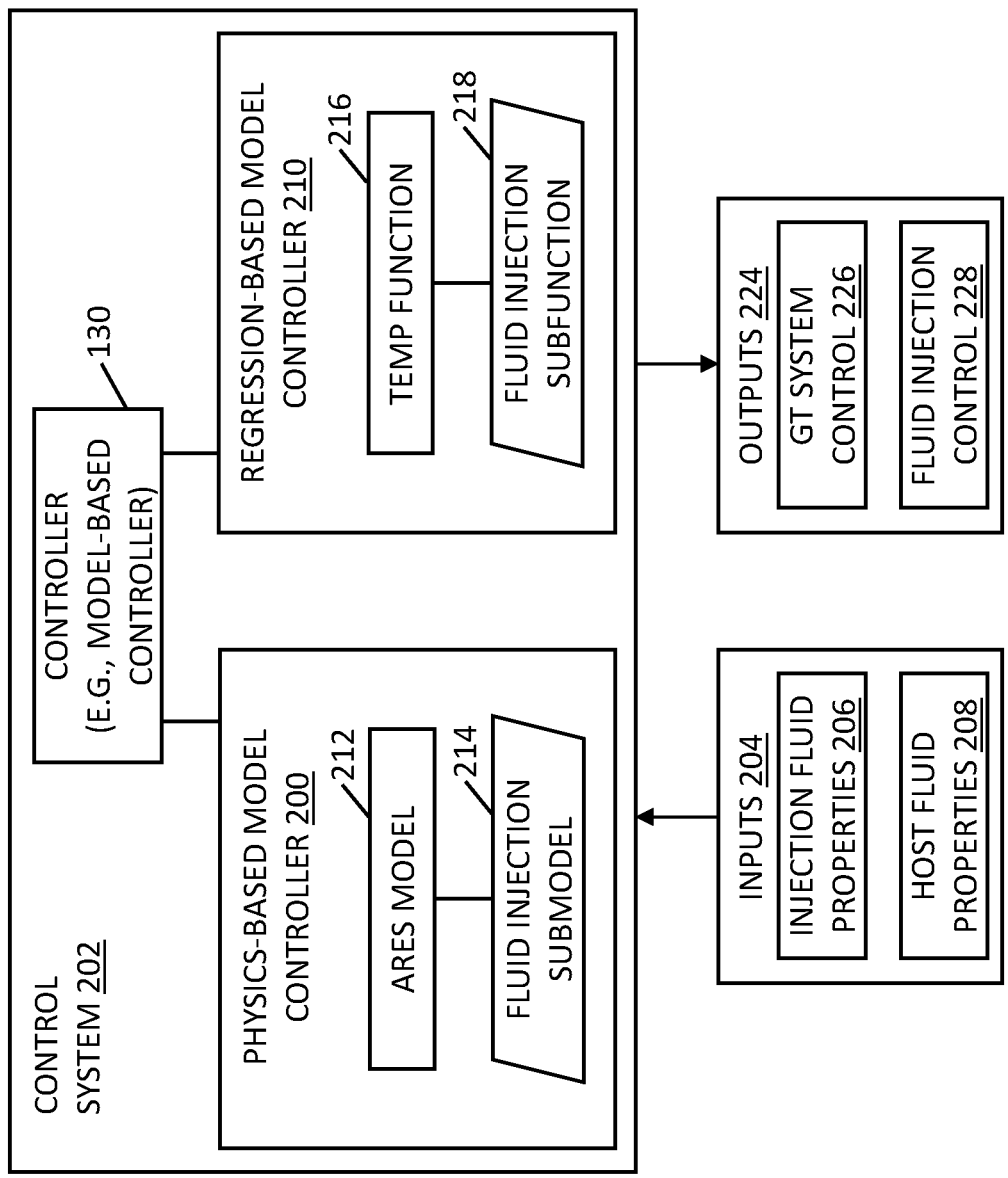
FIG. 2 is a block diagram of an embodiment of a model-based controller of FIG. 1, further illustrating enhancements to consider the fluid injection properties in a physics-based model controller and a regression-based model controller.

FIG. 2 is a block diagram showing embodiments of a physics-based model controller or control unit 200 (e.g., model-based controller having one or more physics-based models) and/or a regression-based model controller or control unit 210 (e.g., model-based controller having one or more regression-based models). In some embodiments, the physics-based model controller 200 and/or the regression-based model controller 210 may be included in the controller 130 and/or operatively coupled to the controller 130 as part of a control system 202. The physics-based model controller 200 and/or the regression-based model controller 210 may include non-transitory code or instructions stored in a machine-readable medium (e.g., memory 142) and executed by a processor (e.g., processor 140) to implement the techniques disclosed herein. The control system 202 is configured to receive one or more inputs 204, such as injection fluid properties 206 and host fluid properties 208, to enhance the model-based control as discussed in detail below. The injection fluid properties 206 correspond to the injection fluid supplied by the fluid injection power management system 150 and the host fluid properties correspond to the host fluid receiving the injection fluid. The injection and host fluid properties 206 and 208 may include mass flow rates, temperatures, pressures, fluid compositions, moisture contents, or any combination thereof. The control system 202 is also configured to provide one or more outputs 224, such as gas turbine system controls 226 for the gas turbine system 102 and fluid injection controls 228 for the fluid injection power management system 150. For example, based on the consideration of the injection fluid properties 206 and the host fluid properties 208, the control system 202 may be configured to use model-based controls with the modifications or upgrades discussed below to improve the controls, such as the gas turbine system controls 226 and the fluid injection controls 228.

In certain embodiments, the physics-based model controller 200 may utilize one or more physics-based models, e.g., an Adaptive Real-time Engine Simulator (ARES) model 212, which may be stored in memory 142 and used to simulate of the operation of a system (e.g., the gas turbine system 102). Additionally, the disclosed physics-based model controller 200 may include one or more features of the gas turbine simulation and control systems disclosed in U.S. Pat. No. 7,742,904, entitled, "METHOD AND SYSTEM FOR GAS TURBINE ENGINE SIMULATION USING ADAPTIVE KALMAN FILTER," which is incorporated by reference herein in its entirety for all purposes. Based on the output of the models (e.g., the ARES model 212), the physics-based model controller 200 may determine a number of parameters of the gas turbine system 102 that should be adjusted (e.g., to improve or modify the performance of the gas turbine system 102). In certain embodiments, the physics-based model controller 200 may be communicatively coupled to the controller 130 to receive information regarding the operation of the gas turbine system 102 (e.g., via sensors 132). For such embodiments, the physics-based model controller 200 may additionally provide the controller 130 with instructions regarding one or more parameters of the gas turbine engine system 102 that may be adjusted, based on the output of the model (e.g., the ARES model 212), to modify the operation of the gas turbine system 102. In some embodiments, the physics-based model controller 200 may be part of the controller 130 (e.g., as hardware, software, or a combination thereof) or may serve as the controller 130, allowing the physics-based model controller 200 to directly communicate with the sensors 132 and/or the components (e.g., the compressor 108, combustors 110, turbine 114, fluid injection power management system 150, or other suitable components) of the gas turbine system 102 to receive information and to control the operation of the gas turbine system 102.

For the gas turbine system 102 illustrated in FIG. 1, the ARES model 212 may simulate the operation of a model turbine system (e.g., physics-based thermodynamic model of the gas turbine system 102). For example, the ARES model 212 may receive inputs regarding the operation of the gas turbine system 102, either directly from the sensors 132 (e.g., via a network) or indirectly from another source (e.g., via the controller 130 or supplied by an operator via the HMI 134). By specific example, the ARES model 212 may receive inputs from sensors 132, including ambient conditions (A), an angle of the inlet guide vanes 121 (IGV), an amount of fuel (FUEL) flowing to the combustors 110, and/or a rotational speed (SPEED) of the gas turbine engine system 102 (e.g., shaft 122 RPM). The ARES model 212 may output a modeled (M) power output (POW_M) such as power to the load 124, modeled turbine exhaust temperature (EXHTEMP_MOD), and/or modeled compressor 108 conditions (C_M). The ARES model 212 may also include Kalman filter embodiments to tune the ARES model 212, for example, by incorporating tuning inputs such as measured values for power output (POW_A), measured values for turbine exhaust temperature (EXTEMP_A), and measure compressor condition (C_A). More specifically, the modeled values may be compared against the measured values to derive a difference for each value, and the difference may then be used as input to a Kalman filter gain matrix to generate normalized correction factor adjustments, which may then be used to tune the ARES model 212.

In the depicted embodiment, the physics-based model controller 200 includes a fluid injection submodel 214. The fluid injection submodel 214 may model how fluid being provided by the fluid injection power management system 150 affects the gas turbine system 102. More specifically, the fluid injection submodel 214 may enable the ARES model 212 to incorporate as input a mass flow of injection fluid from the fluid injection power management system 150, a temperature of the injection fluid, a pressure of the injection fluid, a composition of the injection fluid, a moisture content of the injection fluid, or a combination thereof. The ARES model 212 may then use this added input(s) to derive, via a physics-based thermodynamic model, the new outputs for modeled power output (POW_M), modeled turbine exhaust temperature (EXHTEMP_MOD), and/or modeled compressor 108 conditions (C_M). For example, using the fluid injection submodel 214 with the ARES model 212, the physics-based model controller 200 may receive and process information about the injection fluid (e.g., injection fluid properties 206) from the sensors 132 and/or HMI 134, and then use the information about the injection fluid independently and/or in combination with information about the host fluids (e.g., host fluid properties 208) to enable control adjustments of the gas turbine system 102. The host fluids may include fluid flows receiving the injection fluid, such as compressor discharge flow, compressor bleed flow, combustion and/or exhaust gas flow, etc. In certain embodiments, the fluid injection submodel 214 alone and/or in combination with the ARES model 212 may analyze the injection fluid and host fluid as independent flows, as a combined flow, and/or in ratios of various properties 206 and 208 to enable a better computer simulation of the gas turbine system 102, thereby improving the control adjustments based on the properties of the injection fluid 206 (e.g., flow rate, pressure, temperature, fluid composition, moisture content, etc.).

The physics-based model controller 200 may then use the same inputs (e.g., ambient conditions (A), including fluid injection power management system 150 ambient conditions, the angle of the inlet guide vanes 121 (IGV), the amount of fuel (FUEL) flowing to the combustors 110, and/or a rotational speed (SPEED) of the gas turbine engine system 102) to derive new outputs that incorporate the fluid injection submodel 214. The new outputs may be compared to measurements taken of actual power output, exhaust temperature, and/or compressor conditions and differences between model outputs the incorporate the fluid injection submodel 214 and the actual measured readings may be used as input to the Kalman filter gain matrix to generate normalized correction factor adjustments which may then be used to tune the ARES 212 and/or the fluid injection submodel 214. Accordingly, the fluid injection power management system 150 may be more optimally used with the existing gas turbine system 102.

In certain embodiments, the regression-based model controller 210 may use temperature function(s) 216 (e.g., "firing" temperature functions) to provide control via regression-based techniques rather than through physics-based modeling. For example, a measurement of turbine inlet temperature (TIT), a measurement of an exhaust 118 temperature, and so on, may be used to control the gas turbine system 12 for example, by adjusting fuel flow, air flow (e.g., via inlet guide vanes 121), and so on, to reach a desired reference temperature based on the temperature function(s) 216. For example, the temperature functions may be used in deriving temperature-based control curves used to load, unload, and/or run the gas turbine system 102 at base loads. Instead of directly measuring combustion temperatures, nozzle inlet temperatures, and so on, the temperature function(s) 216 may use as input compressor discharge pressure, axial compressor discharge temperature, axial compressor inlet temperature, ambient temperature, and so on, to derive as output a "firing" temperature reference to be used in controlling the gas turbine engine system 102.

However, without the disclosed embodiments, the temperature function(s) 216 and/or control curve(s) may not incorporate any information about the injection fluid from the fluid injection power management system 150. One approach would be to simply bias the temperature function(s) 216 and resulting control curve(s) by adding (or subtracting) a constant. Accordingly, the control curve(s) may shift right or left (and/or up or down) but retain their shape and/or slope. However, this simple bias may be improved by adding, for example, inputs that include fluid properties for the injection fluid supplied by the fluid injection power management system 150, such as ambient conditions at the fluid injection power management system 150, the injection location 151, and properties of the injection fluid (e.g., mass flow, temperature, pressure, fluid composition, moisture content, etc.).

For example, adding the mass flow of the injection fluid supplied from the fluid injection power management system 150 to the mass flow of the host fluid at the injection location 151 may now give a total mass flow that is a better approximation of the actual flow. Depending on the injection location 151, the injection fluid may be injected into the compressor air flow (e.g., host fluid) from a discharge of the compressor 108 into the combustor 110, or the injection fluid may be injected into the compressor bleed flow (e.g., host fluid) from a bleed port of the compressor 108 to the turbine 114, or the injection fluid may be injected into the turbine 114 separate from the compressor bleed flow. The total combined flows (e.g., injection fluid plus host fluid) may be used as input in the temperature function (216). In certain embodiments, fluid injection subfunction(s) 218 may be used in the regression-based control 210. For example, the fluid injection subfunction(s) 218 may interface with the temperature function(s) 216 to add certain values to the temperature function(s) 216, such as ambient temperatures for the fluid injection power management system 150 and properties of the injection fluid and the host fluid (e.g., fluid composition, mass flow, pressure, temperature, moisture content, etc.). By adding the properties of the injection fluid provided via the fluid injection power management system 150, the techniques described herein may enable regression-based control systems to more efficiently utilize added power. In certain embodiments, the injection fluid and the host fluid may be accounted for separately and/or as a ratio for each fluid property in the temperature function (216) using the fluid injection subfunction(s) 218. As discussed above, Equation (2), (3), or (4) may be used for a modified turbine inlet temperature (TIT) function, which uses ratios of the injection fluid/host fluid to incorporation fluid injection properties to improve the accuracy of the TIT function.

Figure 3:
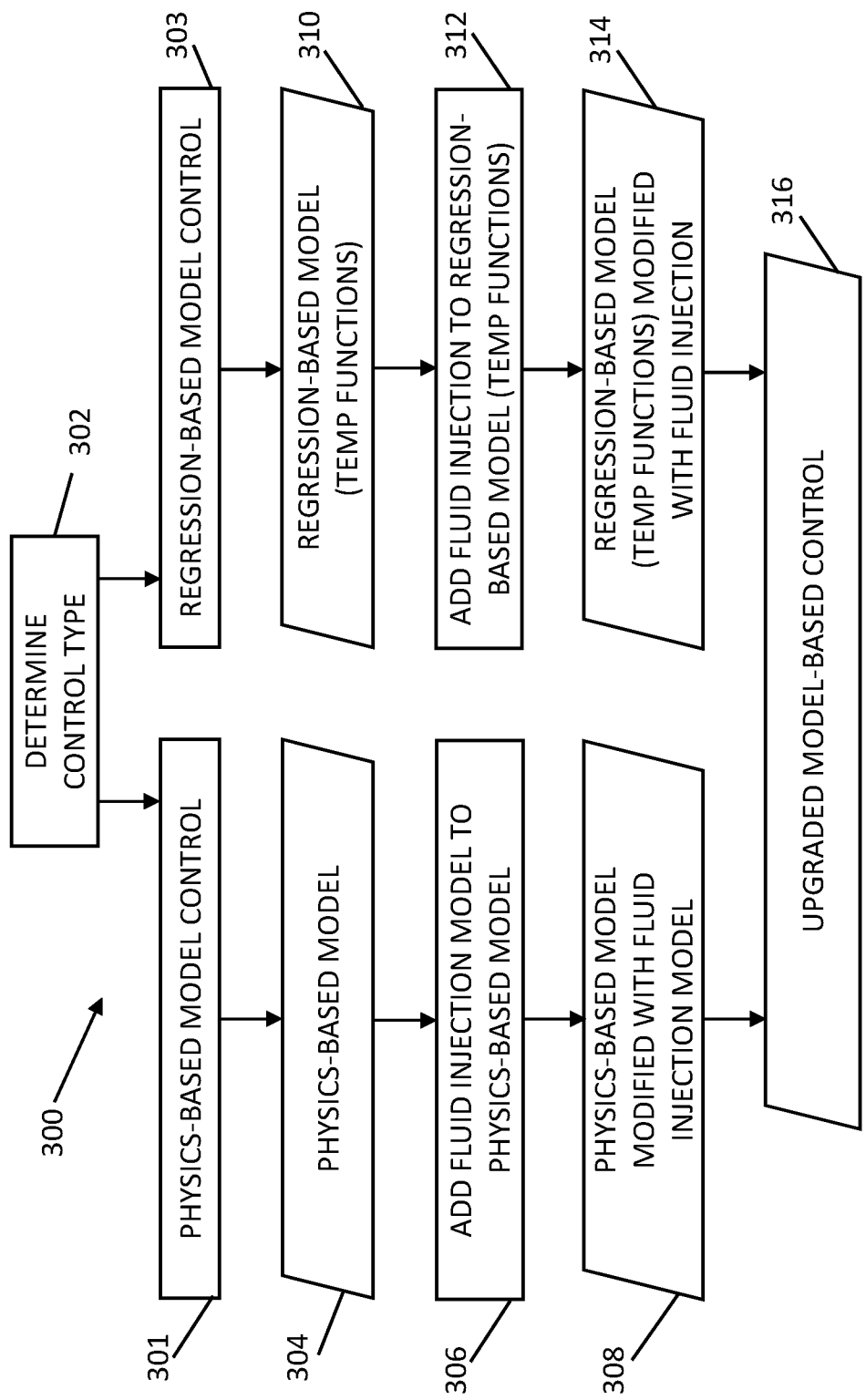
FIG. 3 is a flowchart of an embodiment of a process suitable for upgrading the model-based controller of FIGS. 1 and 2.

FIG. 3 is a flowchart of an embodiment of a process 300 suitable for upgrading or otherwise manufacturing a control system 202, such as the controller 130, that may include the physics-based model controller 200 and/or the regression-based model controller 210. In certain embodiments the process 300 may be implemented as computer code or instructions stored in the memory 142 and executed by the processor(s) 140. The process 300 may be performed in situ with a controller already installed and operating a gas turbine system or with a controller provided as part of a new installation. That is, the controller 130 may be upgraded in the field or upgraded before installation in a new power plant site via the process 300. In the depicted embodiment, the process 300 may determine (block 302) if the control system (e.g., controller 130) to be upgraded or manufactured has a physics-based controller and/or a regression-based controller.

If the controller to be upgraded or manufactured is a physics-based model control 301 (e.g., physics-based model controller 200), then the process 300 may then use a physics-based model 304, such as the ARES model 212. Extra modeling functionality may then be added (block 306). For example, the physics-based model 304 may now incorporate the fluid injection submodel 214, resulting in an upgraded or modified physics-based model 308 having the fluid injection submodel 214. The modified physics-based model 308 may now additionally apply and/or model the injection fluid supplied from the fluid injection power management system 150 to better derive a predicted output, for example, predicted turbine power output, exhaust temperature, exhaust gas emissions, firing temperature, combustion dynamics, combustion properties, turbine inlet temperature, parts reliability and wear, and/or compressor conditions, based on inputs such as ambient conditions (A), including fluid injection power management system 150 ambient conditions, the angle of the inlet guide vanes 121 (IGV), the amount of fuel (FUEL) flowing to the combustors 110, and/or a rotational speed (SPEED) of the gas turbine engine system 102). The modified physics-based model 308 may then be used by the controller 130, for example, to control the power generation system 100 using physics-based model control as part of an updated model-based control 316.

If the process 300 determines (block 302) that the control to be upgraded or manufactured is a regression-based model control 303 (e.g., regression-based model controller 210), then the process 300 may then use a regression-based model 310 (e.g., temperature function), such as the turbine inlet temperature (TIT) function, an exhaust temperature function, and/or combination thereof, and then add (block 312) or otherwise update the regression-based model 310 (temperature function) to incorporate properties of the injection fluid supplied by the fluid injection power management system 150. The result of updates or additions at block 312 is a modified regression-based model 314 (temperature function), which incorporates the fluid injection. For example, the additional information or parameters added to the regression-based model 310 (temperature function) may include properties of the injection fluid, including but not limited to, a fluid composition, a temperature, a pressure, a mass flow rate, a moisture content, or any combination thereof. By further example, the additional information or parameters added to the regression-based model 310 (temperature function) may include properties of the host fluid (e.g., discharge compressor flow, compressor bleed flow, combustion and/or exhaust gas flow, etc.) receiving the injection fluid, such that a relative comparison can be accounted for in the regression-based model 310 (temperature function). In certain embodiments, as discussed above with reference to Equation (2), (3), and (4), the regression-based model 310 (temperature function) may be modified to account for a ratio for each property of the injection fluid relative to the host fluid, such as ratios of mass flow rates, temperatures, pressures, moisture contents, fluid compositions, or any combination thereof. The ratio of fluid composition may include ratios of oxygen content, nitrogen content, or other gas contents. Similar ratios may be used to modify or enhance other regression-based models for parameters of the gas turbine system 102. The updated regression-based model 314 (temperature function) with fluid injection may then be used by the controller 130, for example, to control the power generation system 100 using regression-based model control as part of the updated model-based control 316.

Figure 4:
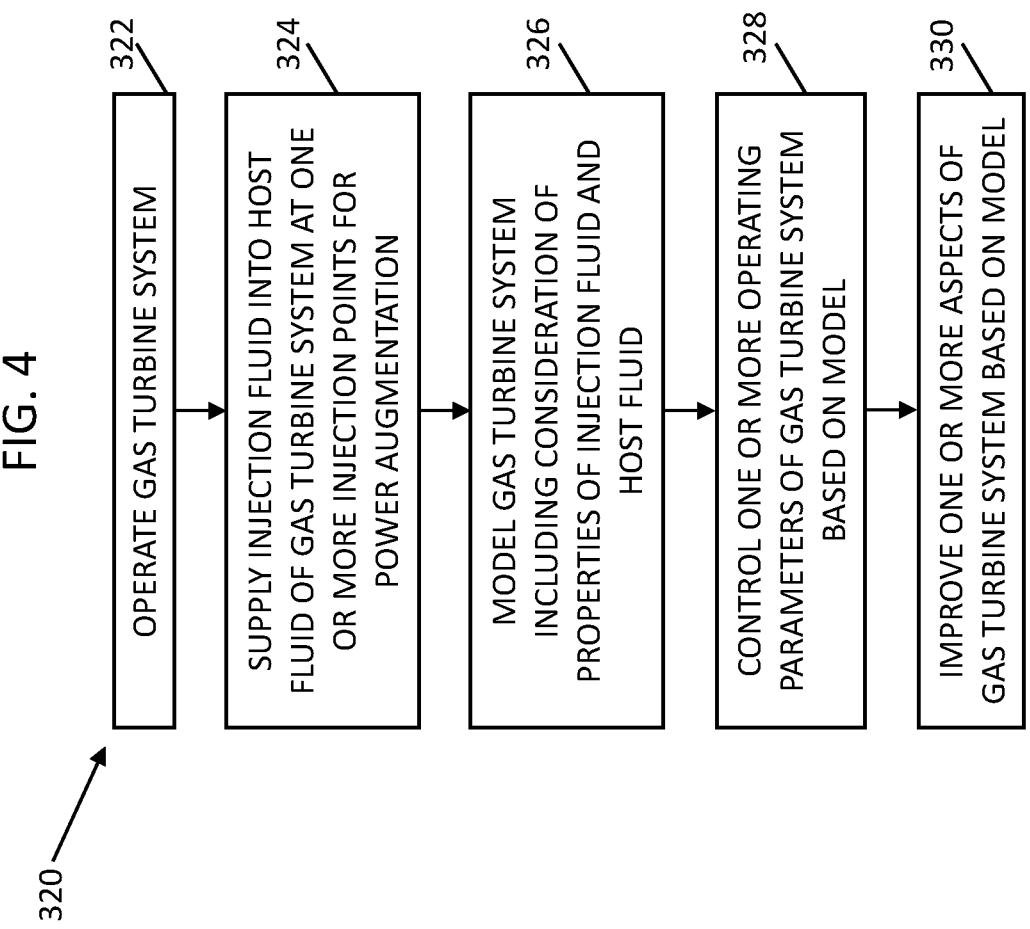
FIG. 4 is a flow chart of an embodiment of a model-based control process for the gas turbine system of FIGS. 1-3, including consideration of fluid injection properties of the injection fluid.

FIG. 4 is a flow chart of an embodiment of a model-based control process 320 for the gas turbine system 102 of FIGS. 1-3. As illustrated, the process 320 includes operating the gas turbine system 102 (block 322), which may include a startup procedure, a steady-state procedure, a shutdown procedure, a part-load operating procedure, a full-load operating procedure, a power grid stabilization procedure, or any combination thereof. At block 324, the process 320 further includes supplying an injection fluid into a host fluid of the gas turbine system 102 at one or more injection points 151 for power management as discussed in detail above. The injection points 151 may be in the compressor discharge casing, the bleed conduit, the turbine, or any combination thereof. Thus, the host fluid may include a main compressor flow to the combustor 110, a compressor bleed flow from the compressor 108 to the turbine 114, or a hot gas flow through the turbine 114 (e.g., combustion gas flow and/or exhaust gas flow).

At block 326, the process 320 includes modeling the gas turbine system 102, including consideration of the properties of the injection fluid and the host fluid. The properties may include, for example, the mass flow rate, the fluid composition, the temperature, the pressure, the moisture content, or any combination, of each of the injection and host fluids. The modeling includes computer modeling using physics-based models, regression-based models, or any combination thereof, as discussed in detail above. However, the modeling is enhanced or improved to model the impact of the fluid injection on the operation of the gas turbine system 102. For example, the modeling may simulate or estimate the impact of the properties of the injection fluid independently from the host fluid, together with the host fluid, as ratios between the injection and host fluids, or any combination thereof. The modeling, enhanced with the injection fluid properties, helps to improve the ability of the computer model to control the gas turbine system 102.

Accordingly, at block 328, the process 320 controls one or more operating parameters of the gas turbine system 102 based on the model (e.g., physics-based model and/or regression-based model enhanced with injection fluid information). The controls may include adjustments to the fuel flow rate, the fuel split between fuel nozzles, the fuel type (e.g., liquid or gas fuel), the fuel composition, the position of inlet guide vanes, the compressor bleed flow, the combustor flame temperature, the turbine inlet temperature, the exhaust emissions, the fluid injection by the fluid injection power management system 150, or any combination thereof. The process 320 further includes improving one or more aspects of the gas turbine system 102 based on the model (block 330). For example, by incorporating the information about the fluid injection into the model, the control of the gas turbine system 102 may provide more precise control of the combustion process (e.g., combustion temperature), a reduction in undesirable exhaust emissions, an increase in efficiency and/or performance of the gas turbine system 102, an improved regulation of speed of the gas turbine system 102 and power produced by an electric generator, or any combination thereof.

Technical effects of the disclosed embodiments include a power production system having a gas turbine system 102 and a fluid injection power management system 150, wherein a controller 130 (e.g., model-based controller) is modified or enhanced to account for properties of injection fluid being used for power management. The model-based controller may include upgrades to one or more physics-based models, one or more regression-based models, or a combination thereof. The model-based controller may receive input regarding injection locations 151, properties of an injection fluid supplied by the fluid injection power management system 150 at the injection locations 151, and properties of a host fluid receiving the injection fluid at the injection locations 151. The model-based controller may analyze the properties of the injection fluid and the host fluid in combination with one another (e.g., as a combined flow), independently from one another (e.g., as separate flows), as ratios relative to one another, or any combination thereof. As discussed above, the fluid injection power management system 150 provides the injection fluid into the gas turbine system 102 at various locations 151, thereby increasing the production of mechanical power. For example, the injection locations 151 may include a compressor discharge casing, a compressor bleed conduit 155, or a supply conduit into a turbine. The modified controller 130 enables improved model-based control of the gas turbine system 102 and the fluid injection power management system 150 by incorporating information about the injection fluid, which would otherwise not be considered by the controller 130. Thus, the modified controller 130 may improve control of various operating parameters, including but not limited to, the firing objectives (e.g., firing temperature, combustion gas temperature inside the combustor, turbine inlet temperature, etc.), combustion dynamics, exhaust gas emissions (e.g., $NO_x$, $CO_x$, $SO_x$, unburnt hydrocarbons, etc.), parts life and reliability, power output, efficiency, or any combination thereof.

The subject matter described in detail above may be defined by one or more clauses, as set forth below.

Clause 1: In certain embodiments, a system includes a gas turbine system having a compressor, a combustor, and a turbine. The system further includes a power management system configured to supply an injection fluid into a host fluid of the gas turbine system to manage or control power production of the gas turbine system, wherein the injection fluid comprises a gas mixture comprising oxygen. The system further includes a model-based controller configured to control operation of the gas turbine system, wherein the model-based controller has one or more models including consideration of the injection fluid supplied by the power management system into the host fluid.

Clause 2: The system of clause 1, wherein the one or more models include a physics-based model of at least the gas turbine system.

Clause 3: The system of clause 1 or 2, wherein the physics-based model includes a fluid injection model of the injection fluid supplied by the power management system into the host fluid.

Clause 4: The system of clauses 1 to 3, wherein the physics-based model includes an Adaptive Real-time Engine Simulator (ARES) model having the fluid injection model.

Clause 5: The system of clauses 1 to 4, wherein the one or more models include a regression-based model of at least the gas turbine system.

Clause 6: The system of clauses 1 to 5, wherein the regression-based model includes at least one fluid injection parameter relating to the injection fluid supplied by the power management system into the host fluid.

Clause 7: The system of clauses 1 to 6, wherein the regression-based model includes a turbine inlet temperature (TIT) function having the at least one fluid injection parameter.

Clause 8: The system of clauses 1 to 7, wherein the one or more models include one or more ratios of properties of the injection fluid relative to the host fluid.

Clause 9: The system of clauses 1 to 8, wherein the one or more ratios of properties include a fluid composition ratio of the injection fluid relative to the host fluid, a flow rate ratio of the injection fluid relative to the host fluid, a temperature ratio of the injection fluid relative to the host fluid, a pressure ratio of the injection fluid relative to the host fluid, a moisture content ratio of the injection fluid relative to the host fluid, or any combination thereof.

Clause 10: The system of clauses 1 to 9, wherein the one or more models include consideration a plurality of fluid properties of the injection fluid, wherein the plurality of fluid properties includes one or more of a flow rate, a fluid composition, a fluid temperature, a fluid pressure, a moisture content, or any combination thereof.

Clause 11: The system of clauses 1 to 10, wherein the power management system includes a tank of the injection fluid, an auxiliary compressor configured to compress the injection fluid, or a combination thereof.

Clause 12: The system of clauses 1 to 11, wherein the power management system includes one or more fluid conduits coupled to a compressor discharge casing of the compressor, a compressor bleed conduit extending between the compressor and the turbine, or one or more stages of the turbine.

Clause 13: The system of clauses 1 to 12, wherein the one or more models are configured to input fluid injection properties of the injection fluid independent from host fluid properties, input fluid injection properties and host fluid properties in combination with one another, or a combination thereof.

Clause 14: The system of clauses 1 to 13, wherein the model-based controller is configured to use the one or more models including consideration of the injection fluid to adjust firing temperature, combustion gas temperature, turbine inlet temperature, exhaust gas emissions, combustion dynamics, fuel flow, inlet guide vane position, compressor bleed flow, or any combination thereof.

Clause 15: In certain embodiments, a system includes a model-based controller configured to control operation of a gas turbine system coupled to a power management system. The gas turbine system has a compressor, a combustor, and a turbine. The power management system is configured to supply an injection fluid into a host fluid of the gas turbine system to manage power production of the gas turbine system, wherein the injection fluid comprises a gas mixture comprising oxygen. The model-based controller has a processor, a memory, and one or more models including consideration of the injection fluid supplied by the power management system into the host fluid.

Clause 16: The system of clause 15, wherein the one or more models include a physics-based model of at least the gas turbine system, wherein the physics-based model includes a fluid injection model of the injection fluid supplied by the power management system into the host fluid.

Clause 17: The system of clause 15 or 16, wherein the one or more models include a regression-based model of at least the gas turbine system, wherein the regression-based model includes at least one fluid injection parameter relating to the injection fluid supplied by the power management system into the host fluid.

Clause 18: The system of clauses 15 to 17, wherein the one or more models include one or more ratios of properties of the injection fluid relative to the host fluid, wherein the one or more ratios of properties include a fluid composition ratio of the injection fluid relative to the host fluid, a flow rate ratio of the injection fluid relative to the host fluid, a temperature ratio of the injection fluid relative to the host fluid, a pressure ratio of the injection fluid relative to the host fluid, a moisture content ratio of the injection fluid relative to the host fluid, or any combination thereof.

Clause 19: In certain embodiments, a method includes controlling operation of a gas turbine system coupled to a power management system via a model-based controller. The gas turbine system has a compressor, a combustor, and a turbine. The power management system is configured to supply an injection fluid into a host fluid of the gas turbine system to manage power production of the gas turbine system, wherein the injection fluid comprises a gas mixture comprising oxygen. The model-based controller has one or more models including consideration of the injection fluid supplied by the power management system into the host fluid.

Clause 20: The method of clause 19, wherein the one or more models include a physics-based model, a regression-based model, or a combination thereof, wherein the one or more models include one or more ratios of properties of the injection fluid relative to the host fluid, wherein the one or more ratios of properties include a fluid composition ratio of the injection fluid relative to the host fluid, a flow rate ratio of the injection fluid relative to the host fluid, a temperature ratio of the injection fluid relative to the host fluid, a pressure ratio of the injection fluid relative to the host fluid, a moisture content ratio of the injection fluid relative to the host fluid, or any combination thereof The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   a gas turbine system having a compressor, a combustor, and a turbine;
   a power management system comprising a supply conduit coupled to at least one injection location of the gas turbine system between a compressor discharge from the compressor and an exhaust outlet from the turbine, wherein the power management system is configured to supply an injection fluid through the supply conduit into a host fluid of the gas turbine system via the at least one injection location to manage the power production of the gas turbine system, wherein the injection fluid comprises a gas mixture comprising oxygen; and
   a model-based controller configured to control operation of the gas turbine system, wherein the model-based controller comprises one or more models including consideration of the at least one injection location and the injection fluid supplied by the power management system into the host fluid,
   wherein the one or more models comprise two or more ratios of properties of the injection fluid relative to the host fluid, wherein the two or more ratios of properties include two or more of a fluid composition ratio of the injection fluid relative to the host fluid, a flow rate ratio of the injection fluid relative to the host fluid, a temperature ratio of the injection fluid relative to the host fluid, a pressure ratio of the injection fluid relative to the host fluid, a moisture content ratio of the injection fluid relative to the host fluid, or any combination thereof.

2. The system of claim 1, wherein the one or more models comprise a physics-based model of at least the gas turbine system.

3. The system of claim 2, wherein the physics-based model includes a fluid injection model of the injection fluid supplied by the power management system into the host fluid.

4. The system of claim 3, wherein the physics-based model includes an Adaptive Real-time Engine Simulator (ARES) model having the fluid injection model.

5. The system of claim 1, wherein the one or more models comprise a regression-based model of at least the gas turbine system.

6. The system of claim 5, wherein the regression-based model includes at least one fluid injection parameter relating to the injection fluid supplied by the power management system into the host fluid.

7. The system of claim 6, wherein the regression-based model includes a turbine inlet temperature (TIT) function having the at least one fluid injection parameter defined by an equation: TIT (modified)=TIT+C*MFR+D*TR+E*PR+F*CR, wherein TIT=aTAT+$bp_c$+c, wherein a, b, c, C, D, E, and F are constants, wherein TAT is a turbine outlet temperature, wherein $p_c$ is a pressure at the compressor discharge, wherein MFR is a mass flow ratio of the injection fluid/host fluid, wherein TR is the temperature ratio of the injection fluid/host fluid, wherein PR is the pressure ratio of the injection fluid/host fluid, and wherein CR is the fluid composition ratio of the injection fluid/host fluid.

8. The system of claim 1, wherein the at least one injection location comprises a plurality of different injection locations of the injection fluid.

9. The system of claim 1, wherein the one or more models comprise three or more ratios of properties of the injection fluid relative to the host fluid, wherein the three or more ratios of properties include three or more of the fluid composition ratio of the injection fluid relative to the host fluid, the flow rate ratio of the injection fluid relative to the host fluid, the temperature ratio of the injection fluid relative to the host fluid, the pressure ratio of the injection fluid relative to the host fluid, the moisture content ratio of the injection fluid relative to the host fluid, or any combination thereof.

10. The system of claim 1, wherein the power management system comprises a plurality of injection fluid sources coupled to the at least one injection location of the gas turbine system, and a plurality of valves controlled by the model-based controller to selectively control injection of the injection fluid from the plurality of injection fluid sources into the at least one injection location.

11. The system of claim 1, wherein the power management system comprises an auxiliary compressor configured to compress the injection fluid, and the auxiliary compressor is separate from the compressor of the gas turbine system.

12. The system of claim 1, wherein the supply conduit is coupled to the at least one injection location of the gas turbine system at two or more of:
 a first injection location at a compressor discharge casing of the compressor;
 a second injection location at a compressor bleed conduit extending between the compressor and the turbine; or
 a third injection location at one or more stages of the turbine.

13. The system of claim 1, wherein the one or more models are configured to input fluid injection properties of the injection fluid independent from host fluid properties, and input fluid injection properties and host fluid properties in combination with one another.

14. The system of claim 1, wherein the model-based controller is configured to use the one or more models including consideration of the injection fluid to adjust two or more of firing temperature, combustion gas temperature, turbine inlet temperature, exhaust gas emissions, combustion dynamics, fuel flow, inlet guide vane position, compressor bleed flow, or any combination thereof.

15. A system, comprising:
 a model-based controller configured to control operation of a gas turbine system coupled to a power management system, wherein the gas turbine system has a compressor, a combustor, and a turbine, wherein the power management system is configured to supply an injection fluid into a host fluid of the gas turbine system via a supply conduit coupled to at least one injection location of the gas turbine system between a compressor discharge from the compressor and an exhaust outlet from the turbine to manage power production of the gas turbine system, wherein the injection fluid comprises a gas mixture comprising oxygen, wherein the model-based controller comprises a processor, a memory, and one or more models including consideration of the at least one injection location and the injection fluid supplied by the power management system into the host fluid,
 wherein the one or more models comprise two or more ratios of properties of the injection fluid relative to the host fluid, wherein the two or more ratios of properties include two or more of a fluid composition ratio of the injection fluid relative to the host fluid, a flow rate ratio of the injection fluid relative to the host fluid, a temperature ratio of the injection fluid relative to the host fluid, a pressure ratio of the injection fluid relative to the host fluid, a moisture content ratio of the injection fluid relative to the host fluid, or any combination thereof.

16. The system of claim 15, wherein the one or more models comprise a physics-based model of at least the gas turbine system, wherein the physics-based model includes a fluid injection model of the injection fluid supplied by the power management system into the host fluid.

17. The system of claim 15, wherein the one or more models comprise a regression-based model of at least the gas turbine system, wherein the regression-based model includes at least one fluid injection parameter relating to the injection fluid supplied by the power management system into the host fluid.

18. The system of claim 17, wherein the regression-based model includes a turbine inlet temperature (TIT) function having the at least one fluid injection parameter defined by an equation: TIT (modified)=TIT+C*MFR+D*TR+E*PR+F*CR, wherein TIT=aTAT+$bp_c$+c, wherein a, b, c, C, D, E, and F are constants, wherein TAT is a turbine outlet temperature, wherein $p_c$ is a pressure at the compressor discharge, wherein MFR is a mass flow ratio of the injection fluid/host fluid, wherein TR is the temperature ratio of the injection fluid/host fluid, wherein PR is the pressure ratio of the injection fluid/host fluid, and wherein CR is the fluid composition ratio of the injection fluid/host fluid.

19. The system of claim 15, wherein the one or more models comprise three or more ratios of properties of the injection fluid relative to the host fluid, wherein the three or more ratios of properties include three or more of the fluid composition ratio of the injection fluid relative to the host fluid, the flow rate ratio of the injection fluid relative to the host fluid, the temperature ratio of the injection fluid relative to the host fluid, the pressure ratio of the injection fluid relative to the host fluid, the moisture content ratio of the injection fluid relative to the host fluid, or any combination thereof.

20. A method, comprising:
controlling operation of a gas turbine system coupled to a power management system via a model-based controller, wherein the gas turbine system has a compressor, a combustor, and a turbine, wherein the power management system is configured to supply an injection fluid into a host fluid of the gas turbine system at a plurality of different injection locations between a compressor discharge from the compressor and an exhaust outlet from the turbine to manage power production of the gas turbine system, wherein the injection fluid comprises a gas mixture comprising oxygen, wherein the model-based controller comprises one or more models including consideration of the plurality of different injection locations and the injection fluid supplied by the power management system into the host fluid,
wherein the one or more models comprise two or more ratios of properties of the injection fluid relative to the host fluid, wherein the two or more ratios of properties include two or more of a fluid composition ratio of the injection fluid relative to the host fluid, a flow rate ratio of the injection fluid relative to the host fluid, a temperature ratio of the injection fluid relative to the host fluid, a pressure ratio of the injection fluid relative to the host fluid, a moisture content ratio of the injection fluid relative to the host fluid, or any combination thereof.

21. The method of claim 20, wherein the one or more models comprise a physics-based model, a regression-based model, or a combination thereof.

22. The system of claim 20, wherein the one or more models comprise three or more ratios of properties of the injection fluid relative to the host fluid, wherein the three or more ratios of properties include three or more of the fluid composition ratio of the injection fluid relative to the host fluid, the flow rate ratio of the injection fluid relative to the host fluid, the temperature ratio of the injection fluid relative to the host fluid, the pressure ratio of the injection fluid relative to the host fluid, the moisture content ratio of the injection fluid relative to the host fluid, or any combination thereof.

* * * * *